United States Patent [19]
Choi

[11] Patent Number: 5,245,834
[45] Date of Patent: Sep. 21, 1993

[54] CONDENSATE TANK OF A DEHUMIDIFIER

[75] Inventor: Sun G. Choi, Suweon, Rep. of Korea

[73] Assignee: Samsung Electronics Co., Ltd., Suweon, Rep. of Korea

[21] Appl. No.: 916,713

[22] Filed: Jul. 22, 1992

[30] Foreign Application Priority Data

Aug. 27, 1991 [KR] Rep. of Korea .............. 91-14876

[51] Int. Cl.$^5$ .............................................. F25D 21/14
[52] U.S. Cl. .................................. 62/150; 200/84 R
[58] Field of Search ....................... 62/150; 200/84 R

[56] References Cited

U.S. PATENT DOCUMENTS

| | | | |
|---|---|---|---|
| 1,304,936 | 5/1919 | Boardman | 200/84 R |
| 1,603,281 | 10/1926 | Heeter | 200/84 R |
| 2,882,366 | 4/1959 | Fay | 200/84 R |
| 3,110,161 | 11/1963 | Maleck | 62/150 |
| 3,504,145 | 3/1970 | Layher | 200/84 R |
| 4,132,936 | 1/1979 | Fujiwara | 200/84 R |
| 4,475,359 | 10/1984 | Sano | 62/272 |

FOREIGN PATENT DOCUMENTS

| | | | |
|---|---|---|---|
| 271917 | 3/1914 | Fed. Rep. of Germany | 200/84 R |
| 58-133540 | 8/1958 | Japan | |
| 58-158435 | 9/1958 | Japan | |

Primary Examiner—Tim Miles
Attorney, Agent, or Firm—Burns, Doane, Swecker & Mathis

[57] ABSTRACT

A storage tank for receiving condensate from the evaporator of a dehumidifier includes a switch which signals when the tank is filled. The tank includes a cover upon which the condensate impacts after falling from the evaporator. The condensate flows to a drain passage of the cover to enter the storage tank. A spherical float is floating freely on the stored condensate. The underside of the cover forms an upwardly inclined guide surface which guides the float toward a switch as the level of condensate rises, whereupon the float actuates the switch.

7 Claims, 2 Drawing Sheets

CONDENSATE TANK OF A DEHUMIDIFIER

FIELD OF THE INVENTION

The present invention is related to a condensate storing apparatus of a dehumidifier, and more particularly to a sensing device for detecting a quantity of condensate stored in the condensate storing apparatus.

BACKGROUND OF THE INVENTION

A condensate tank is provided under the evaporator of a dehumidifier. In one prior art device, the condensate tank includes a float which is connected to one end of a lever. As the volume of the condensate increases, the float rises causing the opposite end of the lever to touch a switching member which turns off the device or signals an alarm. The lever moves about a pivot point which is mounted on a side wall of the dehumidifier.

In another prior art device, a belt is provided in a condensate tank. The belt runs between a pair of pulleys which are mounted vertically and spaced apart. A float is installed on one side of the belt with a lever installed on the opposite side of the belt. As the float approaches a higher point, the lever moves downward from the switching member thereby stopping the operation of the dehumidifier. These devices are illustrated in Japanese Laid-Open Patents No. 58-133540 (1983) and No. 58-158435 (1983).

Another prior art device includes a float mechanism which hingedly moves up and down as shown in U.S. Pat. No. 4,475,359.

One difficulty that sometimes occurs during the operation of a float in the condensate stored tank is that the movement of the float may not be accurate. That is, the above devices require a plurality of complex components, and the pivot for swinging the lever may become loose as a result of numerous operations of the float. In addition, the float can be moved to touch the switching member by a slight shaking motion of the device. Further, the switching member may malfunction causing the condensate to overflow.

SUMMARY OF THE INVENTION

It is an object of the present invention to provide a sensing device for a condensate storing tank which accurately operates.

It is a further object of the present invention to provide a sensing device for a condensate storing tank which has a simple and durable structure.

According to the present invention, the sensing device of the condensate storing tank comprises a body for receiving and storing condensate, and a nonmetallic float freely and independently floating on the condensate stored in the body. A cover member is mounted on the body. A switching member is operated by being contacted by an upper surface of the float. The cover member also provides a drain passage at a lower corner, and an opening at a higher corner which enables the float to partially protrude therethrough. The cover member also includes a ramp which slopes away from a dividing ridge which extends from the opening at the higher corner to the drain passage at the lower corner. Thus, the ramp has a guiding surface which guides the float along the ridge and between the surfaces which slope therefrom.

Since dehumidifiers generally operate in a continuous manner, the condensate continuously drops on the ramp and flows to the drain passage. The condensate water level rises and the float rises and travels along the guiding surface of the ramp. When the condensate reaches a predetermined volume, the float protrudes through the opening and contacts the switching member to signal an alarm or turn off the device to prevent further condensate from being formed.

As a result of the above structure, the sensing device operated accurately has simple construction, and is easily assembled.

DESCRIPTION OF THE PREFERRED EMBODIMENT

Figure 1:
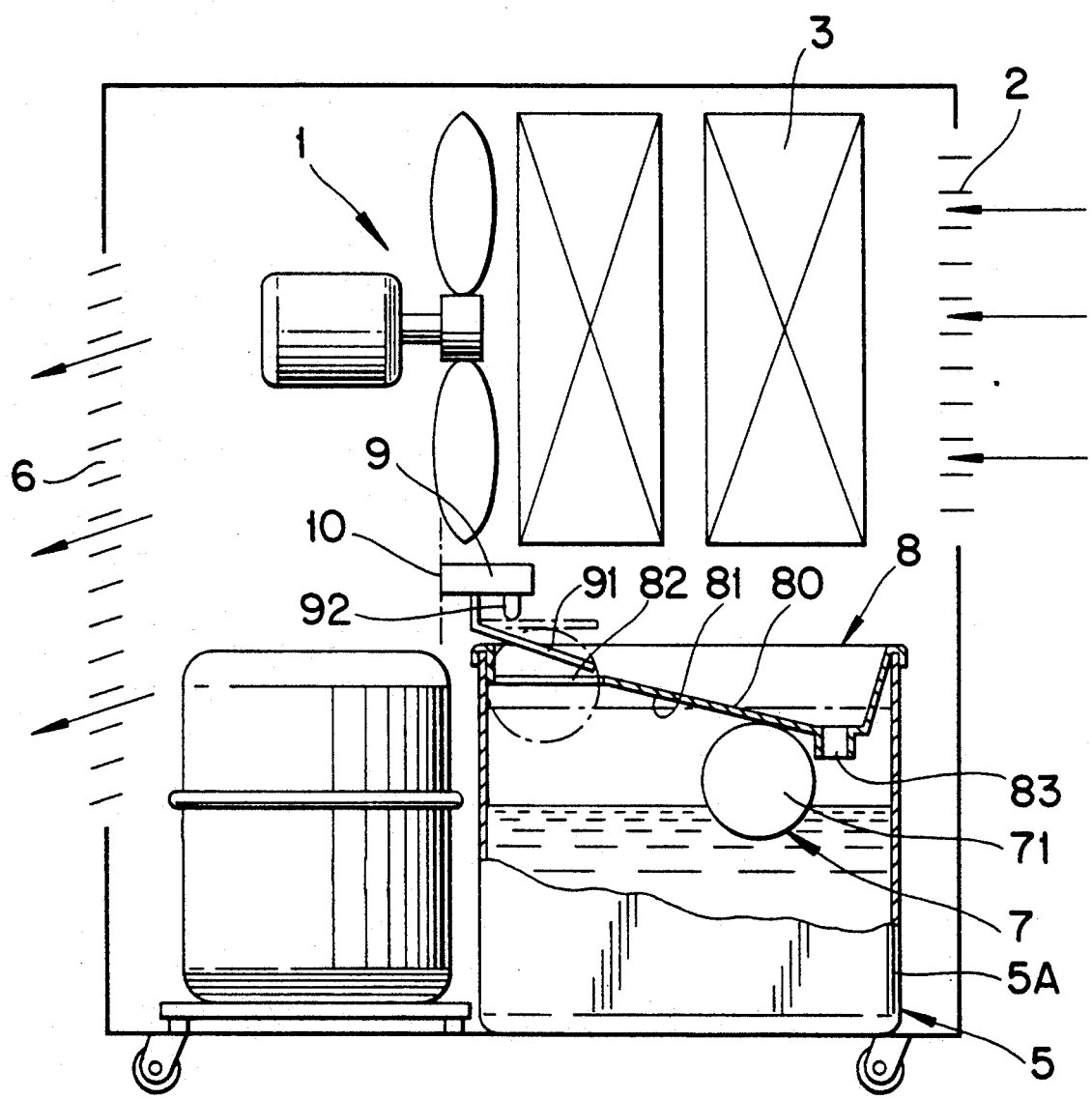
FIG. 1 is a side elevational sectional view illustrating the dehumidifier according to the present invention.

FIG. 1 illustrates a dehumidifier with a condensate storing tank in accordance with the preferred embodiment of the present invention.

Figure 2:
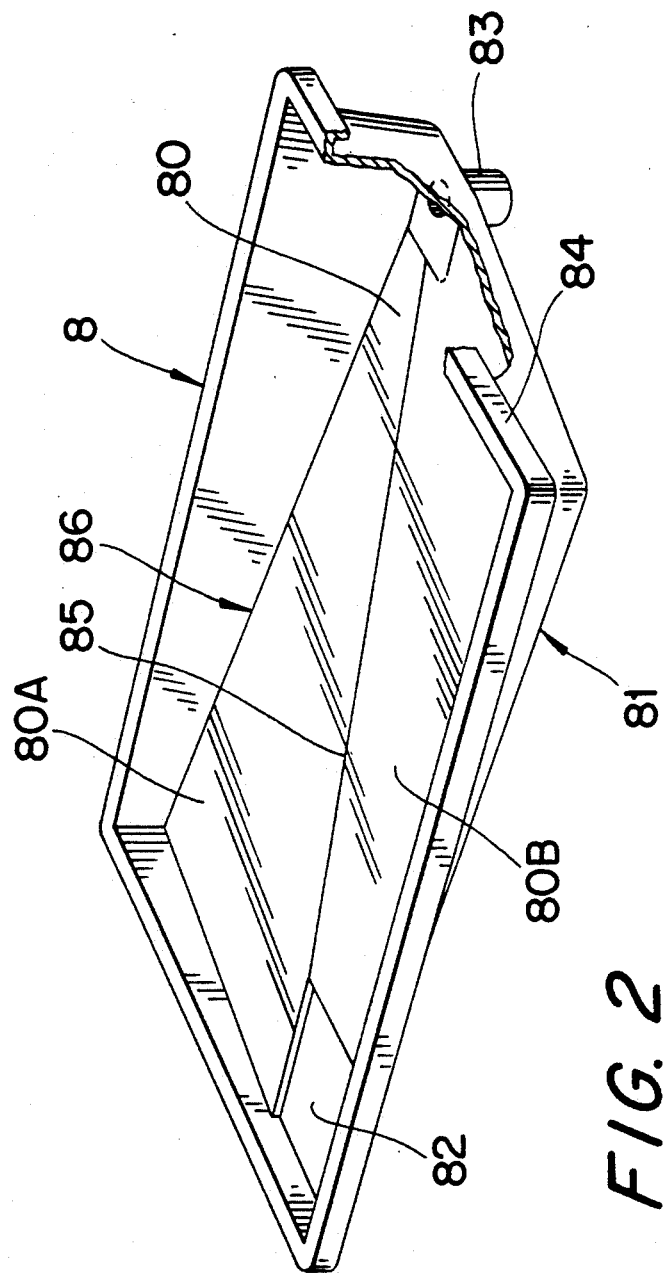
FIG. 2 is a perspective, partially cutaway view of the cover member according to the present invention.

A fan 1 intakes humid air through an inlet 2, and the water vapor in the humid air condenses into water when it contacts the cold surface of an evaporator 3. The dehumidified air then flows out through an exit 6. The condensate on the evaporator 3 then drops onto a cover member 8 and then into a condensate storing tank 5 which is positioned below the evaporator 3. The condensate storing tank 5 comprises a body 5A for collecting and storing the condensate, a float 7 floating on the stored condensate, the cover member 8 mounted on the body 5A, and a switching member 9 which is operated by the float 7. The float is made of a nonmetallic material having good buoyancy, and its shape is structured as a sphere. The float independently floats on the condensate so that it is not bound to any other connecting means such as those shown in prior art. The cover member 8, shown in FIG. 2, has a rectangular shape, and a hooked rim 84 for placement on the body 5A. At one corner of the cover member 8 an opening 82 is formed to enable the float 7 to partially protrude therethrough. At the lower portion of the cover member in a diagonally opposite corner, a drain passage 83 is formed which includes a downward pipe for conducting the water received from the evaporator 3 into the body 5A. The cover member 8 includes a ramp 80 extending from the opening 82 to the drain passage 83. A top side of the ramp 80 is provided with a dividing ridge 85 having sloped surfaces 80A, 80B extending downwardly therefrom. The condensate drops on to the upper surface of the ramp 80, and moves down one of the sloped surfaces to a perimeter 86 of the ramp 80. Along the perimeter 86 the condensate goes toward the drain passage 83. Further, an underside of the ramp 80 provides a guiding surface 81 which is shaped complementarily to the top side, i.e., it has two surface portions sloping upwardly toward the ridge 85. Also, both surface portions are inclined upwardly toward the opening 82. But, the configuration of the guiding surface 81 guides the float to move toward the opening 82 as the body fills. While the body 5A collects the condensate which flows into through the passage 83, the water level rises gradually. Consequently, the float 7 on the water travels to the opening 82 due to the guidance of the guiding surface 81. Finally, the float 7 partly protrudes through the opening 82. The float 7 in this position touches the switching member 9 which is installed over the opening 82. The switching member 9 is mounted on an inner side of a casing 10 of the dehumidifier. The switching member 9 has a straight movable protrusion 92, and a swinging strip 91 adapted to contact the protrusion 92. When the float 7 pushes up the strip 91, the switching member 9 acts to signal an ALARM which gives notice that the tank is full.

According to the present invention, the float 7A on the condensate is not secured to a mechanical structure. Using only buoyancy and the slope of the ramp 80, the float 7 is naturally guided by the guiding surface 81 which extends from the lower portion of the cover member 8 to the higher portion of the cover member 8. Finally, when the tank is full, the float is in the higher portion of the cover member. The float protruding through the opening 82 touches the switching member 9 to sound the alarm or shut off the device. Since the structure of the condensate storing tank is simple, the process of manufacturing is simple resulting in a low rejection rate for poor quality. That is, the device according to the present invention accurately functions to detect the condensate level.

What is claimed is:

1. A dehumidifier storage tank for storing condensate, comprising:
   a body for receiving the condensate,
   switching means actuable in response to the condensate accumulating to a predetermined height in said body, and
   actuating means for actuating said switching means, comprising:
     a float freely floating on the condensate, and
     a ramp disposed adjacent to an upper end of said body, an underside of said ramp including first and second surfaces inclined toward a ridge which is inclined upwardly toward said switching means for guiding said float.

2. A dehumidifier storage tank according to claim 1, wherein said ramp includes an opening disposed beneath said switching means, said first and second surfaces in the region of said ridge being arranged to guide said float toward said opening as said float rises, said float configured such that an upper portion thereof can project through said opening and actuate said switching means.

3. A dehumidifier storage tank according to claim 1, wherein said float is formed of a non-metallic material.

4. A dehumidifier storage tank according to claim 1, wherein said ramp includes a drain passage for conducting condensate supplied to a top side of said ramp.

5. A dehumidifier storage tank according to claim 4, wherein said float is of substantially spherical shape.

6. A dehumidifier storage tank for storing condensate, comprising:
   a body for receiving the condensate,
   switching means actuable in response to the condensate accumulating to a predetermined height in said body, and
   actuating means for actuating said switching means, comprising:
     a float freely floating on the condensate, and
     a cover mounted upon said body and upon which the condensate is received, said cover including a drain passage through which the received condensate travels to and is stored in said body, an underside of said cover being inclined upwardly toward said switching means for guiding said float, an opening being located in an upper end of said cover and adjacent to said switching means, said float configured such that an upper portion thereof can project through said opening and actuate said switching means.

7. A dehumidifier storage tank according to claim 6, wherein said underside of said cover includes first and second surfaces inclined upwardly toward a ridge which is inclined upwardly toward said switching means.

* * * * *